Patented Oct. 2, 1945

2,386,063

UNITED STATES PATENT OFFICE 2,386,063

SATURATED TERPENE RESINS

Alfred L. Rummelsburg, Wilmington, Del., assignor to Hercules Powder Company, Wilmington, Del., a corporation of Delaware No Drawing. Application January 15, 1942,
Serial No. 426,857

15 Claims. (Cl. 260—2)

This invention relates to new resinous compositions of matter and to processes for their production. More particularly, it relates to saturated resins prepared by means of the hydrogenation of a liquid unsaturated bicyclic terpene hydrocarbon compound and the subsequent polymerization of the hydrogenated terpene compound in the presence of a suitable catalyst.

Saturated resins formed in accordance with the methods known in the prior art are prepared by first forming an unsaturated resin which is then saturated by means of a hydrogenation operation using extreme conditions of temperature and pressure. The resulting resins formed under these conditions are undesirable in many respects and their commercial usefulness is limited. Saturated terpene resins produced in accordance with the present invention overcome the undesirable characteristics found in the prior art saturated resin.

Now, in accordance with this invention, saturated terpene resins may be prepared from unsaturated bicyclic terpenes as, for example, alpha and beta pinene, or from saturated bicyclic terpenes as, for example, pinane. Where an unsaturated bicyclic terpene is used as the starting raw material as, for example, alpha or beta pinene, the material is first subjected to a nuclear hydrogenation operation to form a saturated bicyclic terpene hydrocarbon, which saturated compound is then treated with a suitable polymerization catalyst. Where a saturated bicyclic terpene as, for example, pinane is used as the starting product, the above procedure is followed except that the hydrogenation operation is omitted.

More particularly, a saturated terpene resin may be produced from alpha pinene by subjecting the liquid unsaturated terpene hydrocarbon to a hydrogenation operation which includes treatment with hydrogen at a pressure of 500 to 1800 lbs. per square inch at a temperature of about 100° C. in the presence of a suitable catalyst as, for example, reduced nickel on kieselguhr. The resulting saturated terpene hydrocarbon, pinane, is then treated with a suitable polymerization catalyst as, for example, an anhydrous halide of an amphoteric metal, to form a saturated terpene resin.

The method of preparing a saturated bicyclic terpene hydrocarbon and a saturated terpene resin in accordance with this invention is illustrated in the following specific examples, all parts and percentages being by weight unless otherwise specified.

EXAMPLE 1

*Hydrogenation of alpha-pinene to pinane*

158.2 g. of alpha-pinene were hydrogenated in the presence of 8 g. of a 16% reduced nickel on Filter-Cel (diatomaceous earth) catalyst under an initial pressure of 1200 lbs. per sq. inch and at an initial temperature of 115° C. for a period of 10 minutes. During the hydrogenation operation, the mixture was agitated to insure intimate contact of the hydrogen throughout the mixture. At the completion of the hydrogenation, the pressure in the apparatus had dropped to 50 lbs. per sq. inch and the temperature had risen to 149° C. The reduction of the pinene mixture was strongly exothermic. The resulting pinane was separated from the catalyst by filtration. The physical characteristics of the pinane were as follows:

| | |
|---|---|
| Refractive index | 1.4611 at 21° C. |
| Specific gravity | 0.8589 at 20/20° C. |
| Boiling point | 168.2° C. |
| Specific rotation | +13.5° C. |
| Iodine number | 5.0 |
| Thiocyanate number | Nil |
| Unpolymerized residue | 54% |
| Saturation by hydrogen absorption | 101% |

EXAMPLE 2

*Polymerization of pinane using a metal halide*

Pinane was prepared in a manner similar to the method of Example 1 and had the following physical characteristics:

| | |
|---|---|
| Boiling point | 168.0° C.–169.9° C. |
| Refractive index | 1.4614 at 20° C. |
| Thiocyanate value | Nil |

87 g. of this pinane was dissolved in 300 g. of ethylene dichloride to which solution were added 10 g. of anhydrous aluminum chloride at a temperature of 25 to 30° C., agitating the mixture constantly. A strongly exothermic reaction occurred and the temperature increased to about 65° C. within 0.5 hour, after which the reaction mixture was cooled and allowed to stand for 18 hours at 25 to 30° C.

The ethylene dichloride solvent and excess pinane were removed by steam distillation from boiling water. The saturated terpene polymeric residue was then extracted with ether, and water washed. Evaporation of the ether left a residue of 50 g. of viscous oil having the following characteristics:

| | |
|---|---|
| Thiocyanate number | 32 |
| Iodine number | 77 |
| Color | I |
| Molar weight (Rast) | 260 |

The saturated terpene polymer was only slightly soluble in acetone and alcohol and was soluble in benzene, ether, xylene, chlorinated hydrocarbons, and gasoline. It had no appreciable drying properties as was indicated when spread as a film on glass, even in the presence of lead and cobalt driers.

EXAMPLE 3

*Polymerization of pinane using fuller's earth*

In this example, 50 g. of pinane and 25 g. of fuller's earth which had been calcined for ½ hour at approximately 400° C. were agitated in a stainless steel bomb for 9 hours at a temperature of 225° to 250° C. The system was cooled and the contents removed and the saturated terpene resin separated from the catalyst by means of filtration. The filtrate was evaporated by vacuo distillation employing a final bath temperature of 180° C. and pressure of 15 mm. mercury to remove the unreacted pinane. The residue consisting of 30 g. of viscous oil had a color characteristic of F+ (Lovibond). The solubility characteristic and drying properties of this resin are similar to the resin produced in Example 2.

EXAMPLE 4

*Polmerization of pinane using boron trifluoride*

In this example, 50 g. of pinane were dissolved in 50 g. of benzene and treated with gaseous boron trifluoride for a period of approximately 1 hour at a temperature of 10 to 15° C. with constant agitation. During this treating operation, approximately 2 g. of gaseous boron trifluoride were absorbed. The reaction mixture was allowed to stand at 0° C. to 3° C. for a period of 70 hours. The reaction mixture was then water washed in order to remove the catalyst and the washed saturated terpene resin was subjected to vacuo distillation in the manner described with reference to Example 2. A residue of approximately 8 g. of viscous oil was obtained having a color characteristic of F and solubility characteristics and drying properties similar to the resin produced in Example 2.

EXAMPLE 5

*Polmerization of pinane using sulfuric acid*

In this example, 50 g. of pinane were heated with 4 g. of 85% sulfuric acid at 160° C. for a period of 1½ hours during constant agitation of the mixture. The resulting polymerized mixture was thoroughly water washed and then washed in an alkaline medium and again water washed. The washed reaction product was vacuo distilled in a manner described with reference to Example 2. A yield of 3 g. of black colored residue was obtained having solubility characteristics and drying properties similar to the resin described with reference to Example 2.

EXAMPLE 6

*Polymerization of thujane using aluminum chloride*

In this example, 87 g. of thujane were dissolved in 300 g. of ethylene dichloride. To this mixture were added 10 g. of anhydrous aluminum chloride at 25 to 30° C. with constant agitation. The reaction mixture was allowed to stand for 18 hours at 45° C.

The ethylene dichloride solvent and excess thujane were removed by steam distillation from boiling water, as described in Example 2. The polymeric residue was then extracted with ether and water washed. Evaporation of the ether left a residue of viscous oil having solubility characteristics and drying properties similar to the resin described in accordance with Example 2.

EXAMPLE 7

*Polymerization of carane using aluminum chloride*

In this example, 87 g. of carane were dissolved in 300 g. of ethylene dichloride. 10 g. of anhydrous aluminum chloride were added to the carane mixture at 25 to 30° C. with constant agitation. The reaction mixture was allowed to stand for 18 hours at 45° C.

The solvent and excess carane were removed by steam distillation as in Example 2. The saturated polymer was then extracted with ether and water washed. Evaporation of the ether left a residue of viscous oil having solubility characteristics and drying properties similar to the resin described with reference to Example 2.

The liquid bicyclic terpene hydrocarbons found most suitable for the purposes of this invention are those hyrocarbons containing a cyclopropane or a cyclobutane ring as, for example, alpha or beta pinene, alpha and beta thujene and alpha and beta carene.

It has been discovered that alpha pinene is easily hydrogenated at relatively low temperatures and low pressures in the presence of a suitable catalyst as, for example, nickel, which may be suspended on any suitable structure as, for example, Filter-Cel or kieselguhr to form pinane. For example, alpha pinene is completely hydrogenated to pinane by treatment in any suitable apparatus with hydrogen at a pressure of about 500 or about 1800 lbs. per square inch and at a temperature of about 100° C. in the presence of about 3.5% by weight of reduced nickel on kieselguhr as a catalyst. Raney nickel catalyst may also be employed.

Other unsaturated bicyclic terpene hydrocarbons that may be treated are thujene and carene, each of which may be converted to the saturated hydrocarbon thujane and carane respectively by reduction with hydrogen in the presence of platinum black, or other well known hydrogenation catalysts.

After the preparation of the saturated bicyclic terpene hydrocarbon, the hydrocarbon is treated with a suitable catalyst with or without the presence of an inert solvent, for a suitable period of time for the preparation of saturated terpene resins in accordance with this invention. The catalysts operable in the processes are the anhydrous metallic halides as, for example, aluminum chloride, stannic chloride, zinc chloride, etc. Of the metallic halides, anhydrous aluminum chloride is preferred. Boron trifluoride and its organic complexes may also be used as catalytic agents. Acid catalysts as, for example, sulfuric acid, hydrogen fluoride, phosphoric acid, tetraphosphoric acid and HBF$_4$ may be employed, but they are less preferable than the metallic halides, particularly aluminum chloride. Activated clays such as fuller's earth, and synthetic activated clays such as magnesium silicates, etc. may also be employed as catalysts, but they are less preferable than is aluminum chloride. It is found that calcination at 200° C. to 500° C. improves the activity of the clays as catalysts.

Inert solvents that may be used as a diluent for the terpene hydrocarbons to be treated are the liquid aliphatic and aromatic hydrocarbons as, for example, benzene, toluene, hexane, octane, etc. Halogenated hydrocarbons may also be used as a solvent for the terpene hydrocarbons, especially carbon tetrachloride, chloroform, ethylene dichloride, halogenated butanes, acetylene chlorides, and trichloroethylene are found operable. It will be noted that the use of a halogenated solvent, and particularly ethylene dichloride is particularly useful as a terpene hydrocarbon solvent when the metal halide catalysts, aluminum chloride, and stannic chloride are used.

The ratio of the metal halide and acid catalyst to the saturated bicyclic terpene hydrocarbon may vary from about 0.01 to 1.0; and the ratio is preferably from about 0.02 to about 0.2. In the case of activated clay catalyst, the preferred ratio is from about 0.5 to 1.0.

The reaction temperature during the polymerization operation in the presence of metal halide or acid catalysts may vary from about 0° C. to about 300° C. and is preferably maintained at about 20° C. to 150 C. Where an activated clay catalyst is used, the preferred temperature is from about 150° C. to about 250° C. A closed system will be necessary when operating at a polymerization temperature which is above the boiling point of the terpene hydrocarbon being polymerized.

The reaction time may vary from about 1 to about 72 hours depending upon the reacting materials used and the conditions under which the reaction is carried out. It is preferable to adjust the reaction conditions so that the polymerization operation is carried out in from about 2 to about 12 hours.

After the polymerization operation is complete, the catalyst may be removed in any suitable manner as by washing. The metal halide or acid catalyst may be removed from the reaction mixture by means of a water wash. Particularly in the case of the metal halide catalyst as, for example, aluminum chloride and stannic chloride, a complex is formed between the polymer and the catalyst which may be broken down by means of a cold aqueous inorganic acid wash followed by a water wash. Preferably, a hot aqueous solution of 5 to 50% sulfuric acid may be employed to facilitate the break-down of the catalyst-polymer complexes. After completion of the acid and water washing operations, it is desirable to treat the reaction mixture with a suitable adsorbent in order to remove traces of dispersed metal halide catalyst and metal halide-polymer complexes where not removed during the washing operation. Adsorbents found operable are diatomaceous earth, activated carbon, activated clays and the like.

When the polymerization catalyst used is an activated clay removal thereof from the reaction mixture may be made by means of any suitable filtration operation. It is to be noted that in the case of an activated clay catalyst, the water washing step is eliminated and complete removal is made by the filtration operation alone.

Solvent and unreacted terpene hydrocarbons may be removed from the mixture by means of distillation employing steam or vacuo or a combination of both.

Generally, the saturated polymers obtained by means of the polymerization of a saturated terpene hydrocarbon consist of a viscous oil containing a mixture consisting predominantly of the dimer, together with lesser amounts of trimer, tetramer and higher polymers of the hydrocarbon being polymerized. Both the viscosity and melting point of the product may be substantially increased by removing the lower polymers as, for example, the dimer and even the trimer by means of vacuo distillation.

The use of an inert atmosphere as, for example, nitrogen or carbon dioxide to blanket the reaction mixture during the polymerization operation aids in the preparation of pale colored products. The saturated products may be further refined by the use of selective solvents as, for example, furfural, phenol, etc. Suitable adsorbents as, for example, fuller's earth, activated carbon, synthetic magnesium, chromium, and calcium silicates, etc. may also be used to remove the color producing bodies from the product.

The saturated polymers produced in accordance with the present invention are useful as adhesives, for the impregnation of textile fabrics and for lubrication purposes.

What I claim and desire to protect by Letters Patent is:

1. The process of preparing a polymer which comprises treating a saturated bicyclic terpene with a catalyst capable of polymerizing said terpene at a temperature between about 0° C. and about 300° C. until polymerization is substantially complete.

2. The process of preparing a polymer which comprises treating a saturated bicyclic terpene with a metal halide catalyst capable of polymerizing said terpene at a temperature between about 20° C. and about 150° C. until polymerization is substantially complete.

3. The process of preparing a polymer which comprises treating a saturated bicyclic terpene with an acid catalyst capable of polymerizing said terpene at a temperature between about 20° C. and about 150° C. until polymerization is substantially complete.

4. The process of preparing a polymer which comprises treating a saturated bicyclic terpene with an activated clay catalyst capable of polymerizing said terpene at a temperature between about 150° C. and about 250° C. until polymerization is substantially complete.

5. The process of preparing a polymer which comprises treating a saturated bicyclic terpene hydrocarbon having a cyclopropane ring with a catalyst capable of polymerizing said terpene at a temperature between about 0° and about 300° C. until polymerization is substantially complete.

6. The process of preparing a polymer which comprises treating a saturated bicyclic terpene hydrocarbon having a cyclobutane ring with a catalyst capable of polymerizing said terpene at a temperature between about 0° C. and about 300° C. until polymerization is substantially complete.

7. The process of preparing a polymer which comprises treating thujane with a catalyst capable of polymerizing said terpene at a temperature between about 0° C. and about 300° C. until polymerization is substantially complete.

8. The process of preparing a polymer which comprises treating carane with a catalyst capable of polymerizing said terpene at a temperature between about 0° C. and about 300° C. until polymerization is substantially complete.

9. The process of preparing a polymer which comprises treating pinane with a catalyst capable of polymerizing said terpene at a temperature between about 0° C. and about 300° C. until polymerization is substantially complete.

10. The process of preparing a polymer which comprises treating thujane with fuller's earth in the presence of an inert solvent at a temperature between about 150° C. and about 250° C. until polymerization is substantially complete.

11. The process of preparing a polymer which comprises treating carane with sulfuric acid in the presence of an inert solvent at a temperature between about 20° C. and about 150° C. until polymerization is substantially complete.

12. The process of preparing a polymer which comprises treating pinane with a metal halide catalyst capable of polymerizing said terpene at a temperature of between about 0° C. and about 300° C. until polymerization is substantially complete.

13. The process of preparing a polymer which comprises treating pinane with anhydrous aluminum chloride in the presence of an inert solvent at a temperature between about 20° C. and about 150° C. until polymerization is substantially complete.

14. As a new article of manufacture, the resin prepared by treating a saturated bicyclic terpene with a catalyst capable of polymerizing the said terpene at a temperature between about 0° C. and about 300° C.

15. As a new article of manufacture, the resin prepared by treating pinane with a metal halide capable of polymerizing pinane at a temperature between about 0° C. and about 300° C.

ALFRED L. RUMMELSBURG.